United States Patent
Lavin (10) Patent No.: US 7,788,701 B1
(45) Date of Patent: Aug. 31, 2010

(54) CONTENT TRANSFER RESTRICTION SYSTEM FOR PERSONAL INTERNET COMMUNICATOR

(75) Inventor: Jeffrey M. Lavin, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1373 days.

(21) Appl. No.: 11/190,728

(22) Filed: Jul. 26, 2005

(51) Int. Cl.
G06F 17/30 (2006.01)
G06F 7/02 (2006.01)

(52) U.S. Cl. .................... 726/2; 726/26; 726/27; 726/30; 713/165

(58) Field of Classification Search .............. 726/2, 726/26–27; 711/163–164; 713/165
See application file for complete search history.

(56) References Cited

U.S. PATENT DOCUMENTS

| | | | | |
|---|---|---|---|---|
| 5,651,139 A | | 7/1997 | Cripe et al. ................ 395/490 |
| 5,675,769 A | * | 10/1997 | Ruff et al. .................. 711/173 |
| 5,944,820 A | * | 8/1999 | Beelitz ............................ 713/1 |
| 5,974,517 A | | 10/1999 | Gaudet ....................... 711/173 |
| 6,108,785 A | * | 8/2000 | Poisner ........................ 726/20 |
| 6,281,894 B1 | * | 8/2001 | Rive ............................ 715/705 |
| 6,725,178 B2 | * | 4/2004 | Cheston et al. ............ 702/186 |
| 6,832,317 B1 | | 12/2004 | Strongin et al. ............ 713/182 |
| 6,865,431 B1 | * | 3/2005 | Hirota et al. ................. 700/94 |
| 7,185,192 B1 | * | 2/2007 | Kahn .......................... 713/155 |
| 7,305,577 B2 | * | 12/2007 | Zhang .............................. 714/6 |
| 2004/0088513 A1 | * | 5/2004 | Biessener et al. ........... 711/173 |
| 2004/0133790 A1 | * | 7/2004 | Hensley ...................... 713/191 |
| 2005/0268339 A1 | * | 12/2005 | Bobrow ....................... 726/26 |
| 2006/0143417 A1 | * | 6/2006 | Poisner et al. .............. 711/164 |

OTHER PUBLICATIONS

T. Perley et al., "An Overview of the Design of the AMD Personal Internet Communicator," submitted for publication at 2005 Technical, Professional and Student (TPS) Development Conference (Apr. 2005) (8 pages).

AMD Geode GX 533@1.1W Processor* Technical Specs, http://www.amd.com/us-en/ConnectivitySolutions/ProductInformation/0..50_2330_9863_9864.00.html, printed Oct. 6, 2005 (1 page).

"AMD Personal Internet Communication (PIC)—Specification," http://www.amdboard.com/pic.html, printed Oct. 6, 2005 (6 pages).

* cited by examiner

*Primary Examiner*—Edan Orgad
*Assistant Examiner*—Yin-Chen Shaw
(74) *Attorney, Agent, or Firm*—Hamilton & Terrile, LLP; Stephen A. Terrile (57) ABSTRACT

In a personal Internet communication device, a system for restricting the ability of a user to transfer content from within a personal internet communicator includes non-user content stored within a system partition and user data stored within a user partition and an operating system controlling user access so that a user may not access the non-user content stored within the system partition.

12 Claims, 7 Drawing Sheets

CONTENT TRANSFER RESTRICTION SYSTEM FOR PERSONAL INTERNET COMMUNICATOR

BACKGROUND OF THE INVENTION

1. Field of the Invention

The present invention relates to the field of information processing systems. In one aspect, the present invention relates to restricting the ability of a user to transfer content from within a personal internet communicator.

2. Description of the Related Art

Computer systems have attained widespread use for providing information management capability to many segments of today's society. A personal computer system can usually be defined as a microcomputer that includes a system unit having a system processor and associated volatile and non-volatile memory, a display monitor, a keyboard, a fixed disk storage device, an optional removable storage device and an optional printer. These personal computer systems are information processing systems which are designed primarily to give independent computing power to a single user (or a group of users in the case of personal computers which serve as computer server systems) and are inexpensively priced for purchase by individuals or small businesses.

In recent years, there has been significant growth in the use of the personal computers to exchange information over the Internet. This exchange of information is based on a client/server model with the user's personal computer operating as the client to access data stored on a plurality of Internet servers. Some Internet service providers provide a computer to a user as part of a contractual relationship to provide Internet service. As part of the relationship, the Internet service provider may occasionally need to provide software packages to the computer relating to software upgrades and software that provides additional services. In addition, users may also attempt to download computer programs from the Internet or to install programs locally from sources that may not be secure.

When the personal computer systems are provided to a user, it may be desirable to restrict access by the user to certain applications or content. For example, a personal computer system may be provided to a user where certain application licenses or certain content licenses may be linked to the particular personal computer system.

Consequently, there is a need for providing a personal computer system with a system for restricting the ability of a user to transfer content from within the personal computer system.

SUMMARY OF THE INVENTION

In accordance with the present invention, a system for restricting the ability of a user to transfer content from within a personal Internet communicator is disclosed. The protected content (such as protected files for an operating system, protected applications, and protected wallpaper images, etc.) are stored within a system partition. The system partition is configured so that files stored within the system partition are not visible to the user and also so that copying of files within the system partition is not permitted. Additionally, in one embodiment, viewer programs are configured so that the protected content may only be viewed, but not otherwise used. For example, save and copy functions within the viewer program control structure are disabled for files that are stored within the system partition. Data (including images) may be delivered to the user for purchase, but the viewer program may restrict use of the content until the transaction is completed.

The objects, advantages and other novel features of the present invention will be apparent to those skilled in the art from the following detailed description when read in conjunction with the appended claims and accompanying drawings.

In one embodiment, the invention relates to a method for restricting the ability of a user to transfer content from within a personal internet communicator which includes providing the personal internet communicator with non-volatile storage, storing non-user content within the system partition of the non-volatile storage, storing user data within the user partition of the non-volatile storage, and configuring the operating system so that a user may not access the non-user content stored within the system partition. The non-volatile storage includes a system partition and a user partition.

In another embodiment, the invention relates to an apparatus for restricting the ability of a user to transfer content from within a personal internet communicator which includes means for providing the personal internet communicator with non-volatile storage, means for storing non-user content within the system partition of the non-volatile storage, means for storing user data within the user partition of the non-volatile storage, and means for configuring the operating system so that a user may not access the non-user content stored within the system partition. The non-volatile storage includes a system partition and a user partition.

DETAILED DESCRIPTION

While illustrative embodiments of the present invention are described below, it will be appreciated that the present invention may be practiced without the specified details, and that numerous implementation-specific decisions may be made to the invention described herein to achieve the developer's specific goals, such as compliance with system-related and business-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid obscuring or unduly limiting the present invention. Such descriptions and representations are used by those skilled in the art to describe and convey the substance of their work to others skilled in the art. The present invention will now be described with reference to the drawings described below.

Figure 1:
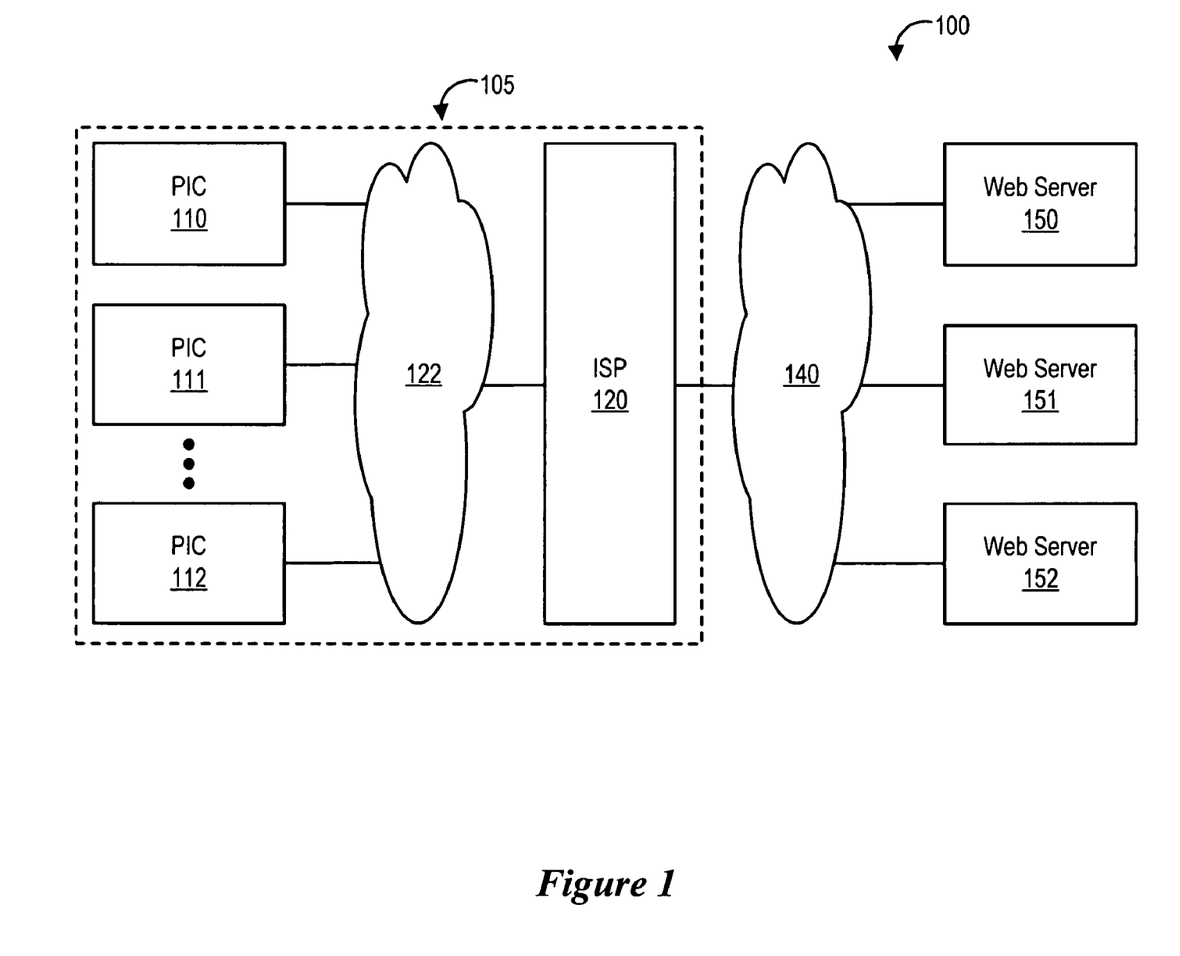
FIG. 1 is a block diagram of a plurality of computer systems communicating over one or more communication networks.

Referring to FIG. 1, a block diagram of an exemplary network 100 is shown wherein a plurality 105 of computer systems 110, 111, 112 communicates over one or more communication networks 140. As illustrated, each computer system (e.g., 110)—also referred to as a multimedia access devices or personal Internet communicators (PICs)—is operably coupled to an Internet service provider (ISP) 120 via one or more communication links 122. The Internet service provider 120 is coupled to the Internet 140 that is further coupled to a plurality of Web host servers 150, 151, 152. A user wishing to access information on the Internet uses a PIC (e.g., 110) to execute an application program stored on the PIC known as a Web browser.

The PIC 110 includes communication hardware and software that allows the PIC 110 to send and receive communications to and from the Internet service provider 120. The communications hardware and software allows the PIC 110 to establish a communication link with the Internet service provider 120. The communication link may be any of a variety of connection types including a wired connection, a direct link such as a digital subscriber line (DSL), T1, integrated services digital network (ISDN) or cable connection, a wireless connection via a cellular or satellite network, phone modem dialup access or a local data transport system, such as Ethernet or token ring over a local area network.

When the customer enters a request for information by entering commands in the Web browser, the PIC 110 sends a request for information, such as a search for documents pertaining to a specified topic, or a specific Web page to the Internet service provider 120 which in turn forwards the request to an appropriate Web host server 150 via the Internet 140. The Internet service provider 120 executes software for receiving and reading requests sent from the browser. The Internet service provider 120 executes a Web server application program that monitors requests, services requests for the information on that particular Web server, and transmits the information to the user's PIC 110.

Each Web host server 150, 151, 152 on the Internet has a known address that the user supplies to the Web browser to connect to the appropriate Web host server. If the information is not available on the user's Web host server 150, the Internet 140 serves as a central link that allows Web servers 150, 151, 152 to communicate with one another to supply the requested information. Because Web servers 150, 151, 152 can contain more than one Web page, the user will also specify in the address which particular Web page he wants to view. The address, also known as a universal resource locator (URL), of a home page on a server is a series of numbers that indicate the server and the location of the page on the server, analogous to a post office address. For simplicity, a domain name system was developed that allows users to specify servers and documents using names instead of numbers. A URL may further specify a particular page in a group of pages belonging to a content provider by including additional information at the end of a domain name.

Figure 2:
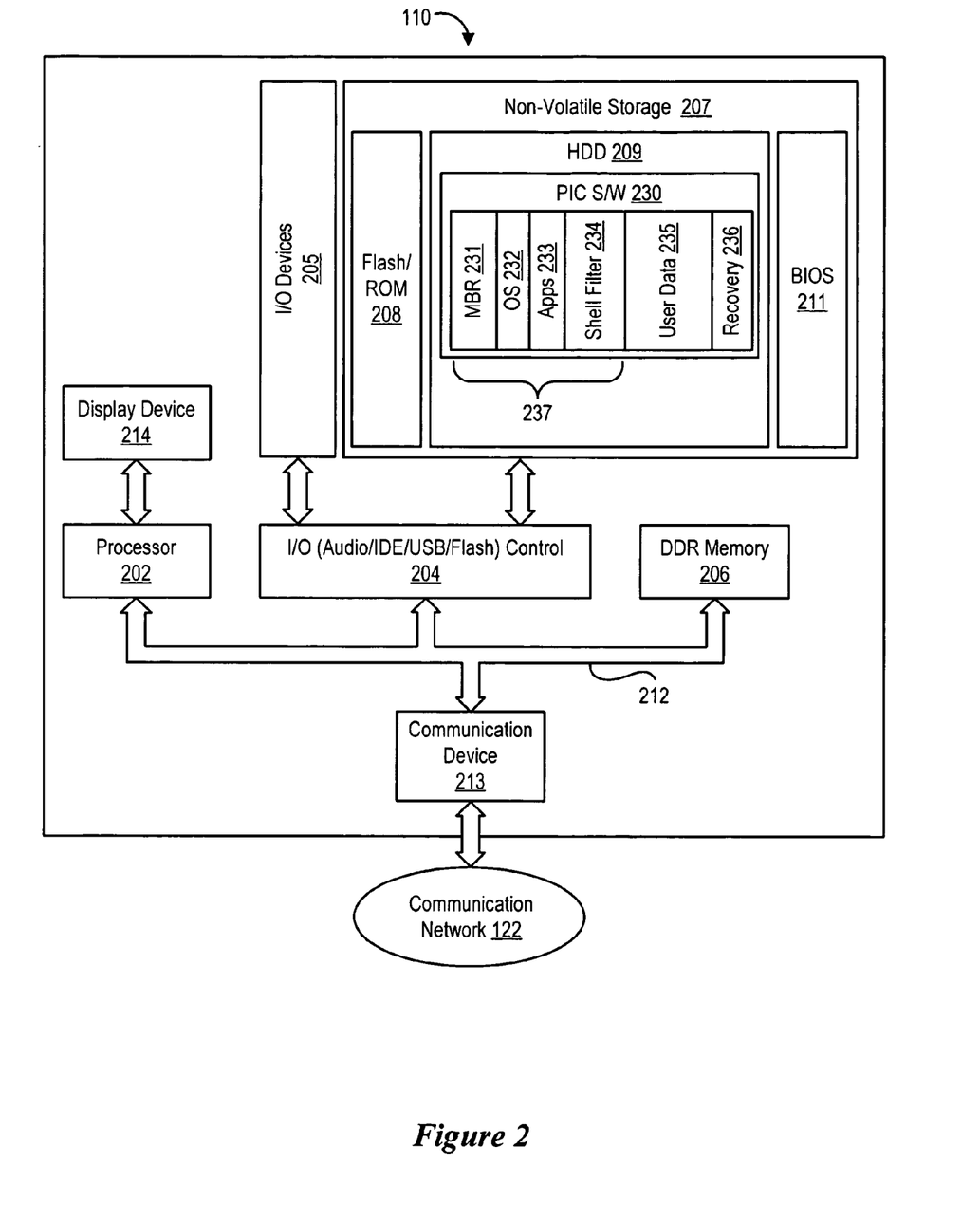
FIG. 2 is a system block diagram of a computer system, such as a personal Internet communicator, in accordance with various embodiments of the present invention.

Referring to FIG. 2, a block diagram of an exemplary computer system 110—also referred to as a multimedia access device or personal Internet communicator (PIC)—is shown. In accordance with a selected embodiment of the present invention, the PIC 110 is designed to be an affordable, easy-to-use and robust consumer device that provides managed Internet access for first-time technology users. To keep the cost affordable and maintain required consumer functionality, a selected embodiment of the PIC 110 includes a monitor or other display device 114 and basic input/output devices 115, such as a USB keyboard and a USB mouse. In addition, ease of use of the PIC 110 is promoted by using preinstalled software with fixed functionality that can not be upgraded by the user. For example, the preinstalled software may include a basic operating system (such as a the Windows CE operating system) and a suite of productivity tools, including communications applications (such as an Internet browser, email, instant messaging, Macromedia Flash, media player, spreadsheet and word processor), viewer applications (e.g., viewers for PowerPoint, Images and PDF), print drivers.

Preinstalled software with fixed or reduced functionality improves the first-time user experience by removing complexity from the user's interaction with the PIC 110. To this end, control functionality is included in the PIC 110 to prevent the user from deleting important programs, such as operating system files, application software, program launch icons, start menu items, program files, preinstalled content or other essential files. In addition or in the alternative, the file navigation capabilities provided to the user are structured in an intuitive way to hide program files stored in a hidden partition, such as a system partition and/or to limit access to files and user data stored in a predetermined partition of the hard drive, such as a "My Documents" directory.

A user wishing to access information or programs on the computer system would conventionally use a file viewer application to access and/or execute program files and data files stored on the PIC. However, a selected embodiment of the present invention uses a shell filter to control the user's interaction with the software and application files on the PIC 110. While a file navigation system could be used to control user access to files, file navigation systems can be circumvented by the user fairly easily. Accordingly, various embodiments of the present invention apply restrictions to the user's abilities to access or delete file by making changes in the shell filter, which can not be circumvented by the end-user.

As illustrated, the PIC 110 includes a processor 102, input/output (I/O) control device 104, memory (including volatile random access memory (RAM) memory 106 and non-volatile memory 107), communication device 113 (such as a modem) and a display 114. The processor 102, I/O controller 104, memory 106 and communication device 113 are interconnected via one or more buses 112. In a selected embodiment, the processor 102 is implemented as an AMD Geode GX 32-bit x86 compatible processor, the memory 106 is implemented as a 128 MB DDR memory and the display 114 is implemented as a CRT monitor. In addition, the non-volatile memory 107 may include a hard disk drive 109 that is implemented as an integrated 3.5 inch hard disk drive with a minimum capacity of, e.g., 10 GB. Either or both of the memories 106, 107 may be integrated with or external to the PIC 110. As for the communication device 113, an integrated 56K ITU v. 92 Modem with an external connector may be used to support different phone systems throughout the world, though other modems (e.g., a soft modem) may also be used. Of course, it will be appreciated that other device configurations may also be used for the processor 102, memory 106, 107, display 114 and communication device 113. For clarity and ease of understanding, not all of the elements making up the PIC 110 are described in detail. Such details are well known to those of ordinary skill in the art, and may vary based on the particular computer vendor and microprocessor type. Moreover, the PIC 110 may include other buses, devices, and/or subsystems, depending on the implementation desired. For example, the PIC 110 may include caches, modems, parallel or serial interfaces, SCSI interfaces, network interface cards, and the like.

As illustrated in FIG. 2, the I/O control device 204 is coupled to I/O devices 205, such as one or more USB ports, a keyboard, a mouse, audio speakers, etc. The I/O control device 204 is also coupled to non-volatile storage 207, such as a flash memory or other read only memory (ROM) 208 and/or hard disk drive 209. The PIC 210 may be connected to a communication network 222, such as the Internet, by a communication device 213, such as a modem, but the connection may be established by any desired network communication device known to those of skill in the art. Though the processor 202 is shown as being coupled directly to a display device 214, the processor may also be coupled indirectly to the display 214 through a display or I/O controller device. Similarly, the processor is shown as being coupled through the I/O controller 204 to the non-volatile memory 207, though direct coupling is also contemplated.

Various programming codes and software are stored in the PIC memory. For example, the basic input/output system (BIOS) code that starts the PIC 210 at startup may be stored in a BIOS ROM device 211 of the non-volatile storage 207, such as a ROM (Read Only Memory) or a PROM (Programmable ROM) such as an EPROM (Erasable PROM), an EEPROM (Electrically Erasable PROM), a flash RAM (Random Access Memory) or any other type of memory appropriate for storing BIOS. The BIOS/Bootloader 211 is essentially invisible to the user and includes a compatible bootloader to enable the PIC operating system to be an embedded closed operating system, such as a Windows CE type operating system, though any operating system (including but not limited to Windows-based and Linux-based Operating Systems) could be supported by the BIOS code. The BIOS/Bootloader 211 is essentially invisible to the user and boots to the operating system.

PIC software 230 and user data may also be stored on the hard drive 209 of the non-volatile storage 207 and executed and/or processed by processor 202. The PIC software 230 may include a master boot record (MBR) 231, an operating system 232, application program(s) 233, user data 235, and a hidden image recovery module 236. The MBR 231 is a small program that is executed when the PIC 210 boots up, and typically resides on the first sector of the hard disk 209. In addition, the MBR 231 may contain a table of partitions on the disk (including the system partition and the user partition). As for the operating system 232, several uniquely configurable operating parameters that can affect the performance of the system are pre-configured as part of the software 230 when it is initially installed on the drive 209. The software 230 also includes application programs 233 that are needed for the PIC 210 to function as specified. For example, the applications 233 may include web browser, Flash player, presentation viewer for PowerPoint, chat, game, compression utility, e-mail, word processor, spreadsheet, PDF viewer, media player and/or drawing applications. In addition, the user data 235 stores all of the user's data so that a user has direct access to the user data. This user data is protected from the rest of the operating system to prevent corruption of the data by a virus or other means.

In accordance with the present invention, predetermined partitions and/or files on the hard drive 209 may be protected against unauthorized access and/or deletion by the user by including a filter program 234 in the PIC software 230 that controls access to the predetermined partition/files by the user. For example, the filter program 234 may provide a shell filter function that restricts the user from seeing or accessing certain restricted programs or files in a predetermined partition. While the functionality of the filter program 234 may be defined in any desired way, a shell filter may be configured to hide any applications or other resources in the operating system partition 232, the applications partition 233 and the recovery partition 236. With the files hidden and inaccessible to the user, there can be no transfer of the content or inadvertent file deletion.

There may be instances where the user should be allowed to view and access certain applications in the PIC software 230, such as application programs that the user might execute. However, inexperienced users may inadvertently delete program files in the course of accessing such programs. Accordingly, in accordance with a selected embodiment of the present invention, the filter program 234 may provide a lockdown filter function that prevents the restricted programs or files in a predetermined partition from being modified or deleted by the user.

In an example implementation, access control to predetermined program files on the hard drive 209 is controlled by the filter program module 234 which prevents the predetermined program files from being deleted and/or seen by the user. The filter program module may control access to the predetermined program files by maintaining configuration data for each program file stored on the hard drive 209. As will be appreciated, the configuration data may be stored in a table as part of the filter program module, or may be derived from each program file as an access attempt on the file is made. Based on the configuration data values, the filter program 234 allows the user to access to program files having a first configuration data value, hides any program files having a second configuration data value and prevents the user from being able to delete program files having a third configuration data value. In an alternative embodiment, the program files having a first configuration data value are hidden from the user and may not be deleted, while program files having a second configuration data value may be seen by the user but may not be deleted, with other program files being fully accessible and/or deletable by the user. In any case, when the user attempts to access or view one or more program files on the hard disk 209 (such as when viewing files with a file navigation system), the filter program module 234 allocates a control function (e.g., hidden, undeletable or full access) to the file(s) based on the configuration data before accessing or displaying the files to the user. In this way, the filter program module 234 may be used to protect the integrity of the operating system or other application files on the PIC 210 from being deleted.

Access control may also be provided outside of the filter program module 234 to restrict the ability of a user to delete content from the PIC 210. In one embodiment, applications that do not use the shell filter module access content can instead use a filter application program interface (API) which causes an application to limit content access by adhering to the distinction between deletable content and un-deletable content. For example, Delete, Save and Save As functions within the viewer program control structure are disabled for protected.

As described herein, the shell filter protects end-users from inadvertently modifying and/or deleting protected content, such as critical components of the operating system (OS), and only user-modifiable data is viewable and accessible on the PIC's hard drive. All other files and folders are hidden and protected. Where access to these protected content is required (such as for installation of customized software components on the OS), a software utility may be provided on an external storage device (such as a USB flash memory) for use in disabling or turning off the shell filter. For example, after copying the filter disabling software utility onto a USB flash memory device and inserting the device into one of the PIC's USB ports, the filter disabling software utility may be run to turn the shell filter off. Depending on the shell filter settings, the protected content may then be accessed, viewed and/or deleted.

In accordance with the present invention, the distinction between protected content and non-protected content may be established in any desired way. For example, protected content may include all content stored on the PIC 210 except user data 235. With this approach, the MBR 231, operating system 232, applications 233, shell filter 234 and recovery module 236 would all be protected against deletion. Alternatively, protected content may include all content stored within the system partition 237. In another embodiment, all or part of the user data 235 is treated as non-protected content that is deletable, while all remaining content is protected. In yet another embodiment, files meeting predetermined file naming protocols or file name endings (e.g., *.doc and *.pdf files) are treated as non-protected.

Figure 3:
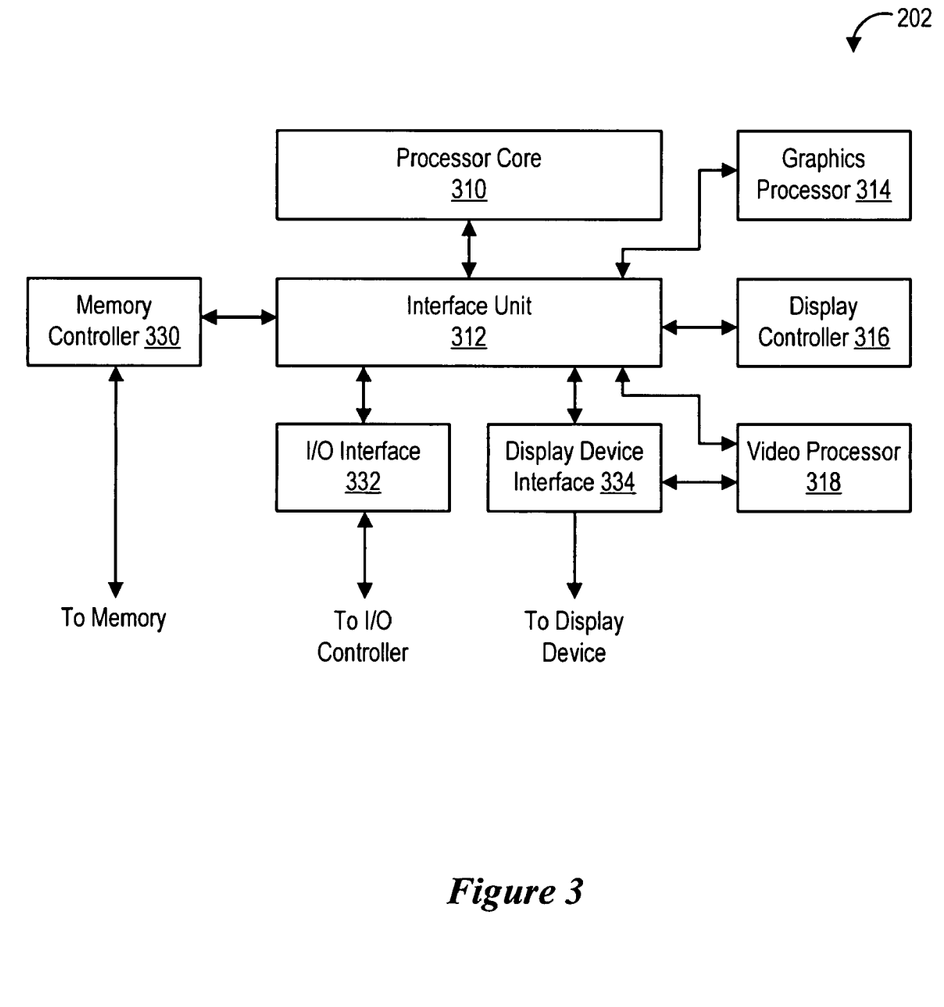
FIG. 3 shows a block diagram of a processor system for use in the personal Internet communicator.

Referring to FIG. 3, a block diagram of the processor 202 is shown. In one embodiment, the processor 202 is a Geode GX2 processor available from Advanced Micro Devices. The processor 202 includes a processor core 310, a bus or interface unit 312, a graphics processor 314, a display controller 316, and a video processor 318. The processor 202 also includes a memory controller 330, an I/O controller interface 332 and a display device interface 334, though it will be appreciated that these controllers and interfaces may be implemented externally to the processor 202. In the illustrated embodiment, the processor 202 executes software stored in the memory 206, 207 to restrict installation of operating systems and other software from boot devices that do not include an authorized signature that matches or corresponds to the unique security key 240.

Figure 4:
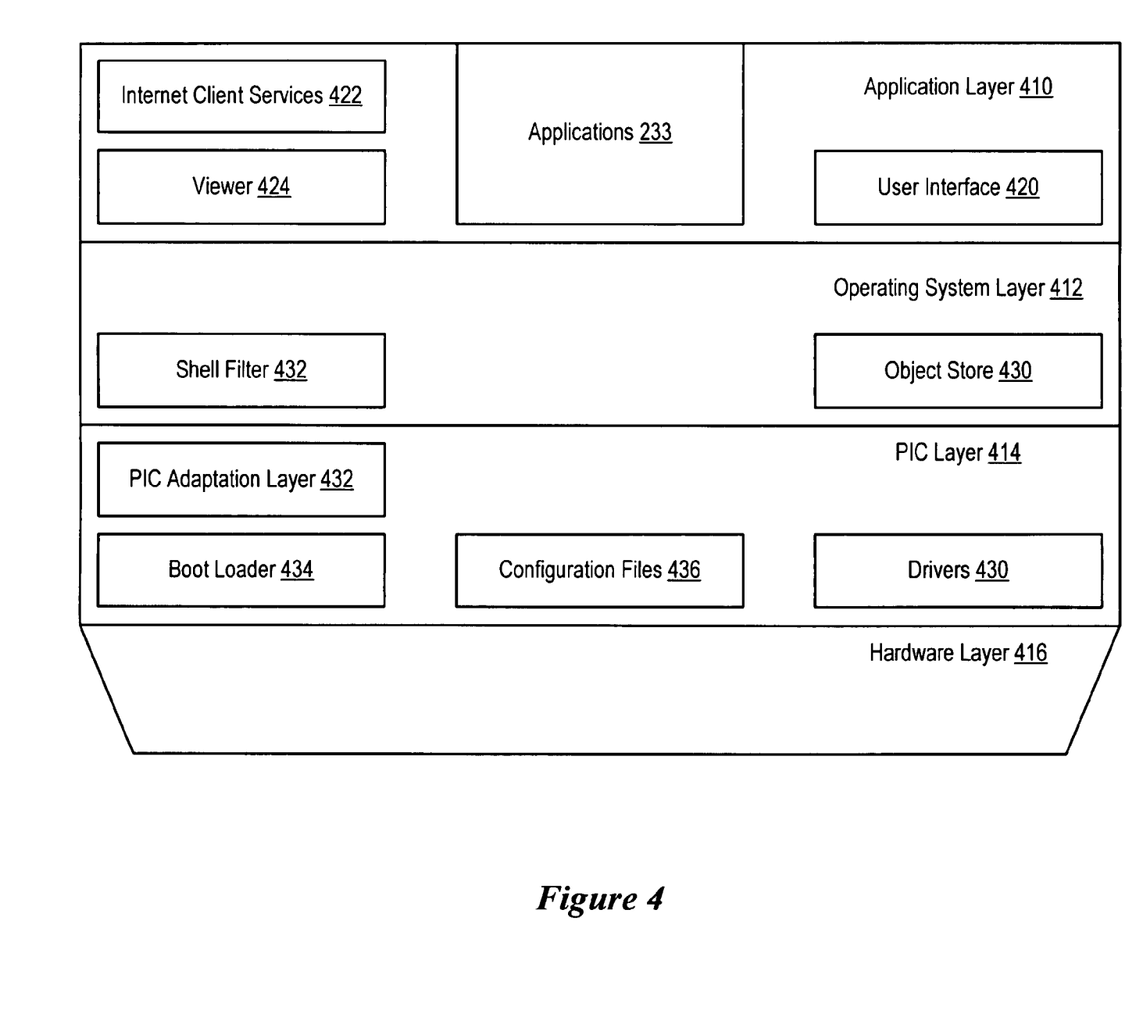
FIG. 4 shows a block diagram of an operating system architecture for use in a personal Internet communicator.

Referring to FIG. 4, a block diagram is shown of an operating system architecture 400 in which a configurable filter program module is provided for use in a computer system, such as a personal Internet communicator. The operating system architecture 400 includes an application layer 410, an operating system layer 412, a PIC layer 414 and a hardware layer 416.

The application layer 410 includes one or more applications 133, a user interface module 420, an Internet client services module 422 and a viewer module 424. The applications 133 include the communications applications which may be accessed by other applications, such as the internet client services module 422 and the viewer module 424. As for the Internet client services module 422, this module provides Internet communication functionality to the PIC. Lastly, the user interface 420 controls the input and output functions for the display, keyboard, mouse and other input/output functions. The viewer module controls a user's ability to access and perform certain file functions on non-user content. For example, the viewer module disables a save function and a copy function for non-user content. In this way transfer of non-user content such as fonts and wallpapers is restricted.

The operating system layer 412 includes an object store module 430 and a shell filter module 432. The operating system layer 412 includes code for providing a plurality of operating system functions such as multimedia functions, graphic windowing and event system functions, device manager functions and communication services and networking functions. The operating system layer 412 also includes code for providing a core dynamic link library (DLL) functionality. The object store module 430 includes the file system and data store for the operating system. The object store module 430 provides persistent storage for applications and their related data even when the PIC is not powered on. The object store 430 integrates read-only files that are stored in a ROM with read and write files of both an application and a user. The data store within the object store module provides storage, access and sorting of property set records. The object store module 430 also includes the system registry which stores data about applications, drivers, user preferences and other configuration settings.

The shell filter module 432 interacts with any application that explores content within the PIC 110. The shell filter module 432 ensures that a user cannot delete protected or non-user content by identifying which directories are visible or accessible to a user when exploring content stored on the HDD 109 of the PIC 110, and then limiting the user's control functionality so that any visible, protected content is not deletable by the user. So for example, a user might be able to see a list of favorites as provided within a web browser, but would not be able to delete the favorites list, though the favorites list could otherwise be accessible for use. Alternatively, applications 133 that do not use the shell filter module 432 can instead access content via a predefine application program interface (API) that causes the application to adhere to the distinction between protected content and un-protected content (e.g., user data), so that only un-protected content may be deleted.

The PIC layer 414 includes a PIC adaptation layer module 442, a boot loader module 444, a configuration files module 446 and a driver module 448. The PIC adaptation layer module 442 provides a layer of code that logically resides between the operating system layer 412 and the hardware 416 of the PIC 110. The PIC adaptation layer module 442 is linked with kernel libraries to create a kernel executable file. The PIC adaptation layer module 442 facilitates communication between the operating system layer 412 and the hardware of the PIC 110. The PIC adaptation layer 442 includes code to handle interrupts, times, power management, bus abstraction, generic Input/Output ConTroL codes (IOCTLs), etc.

Figure 5:
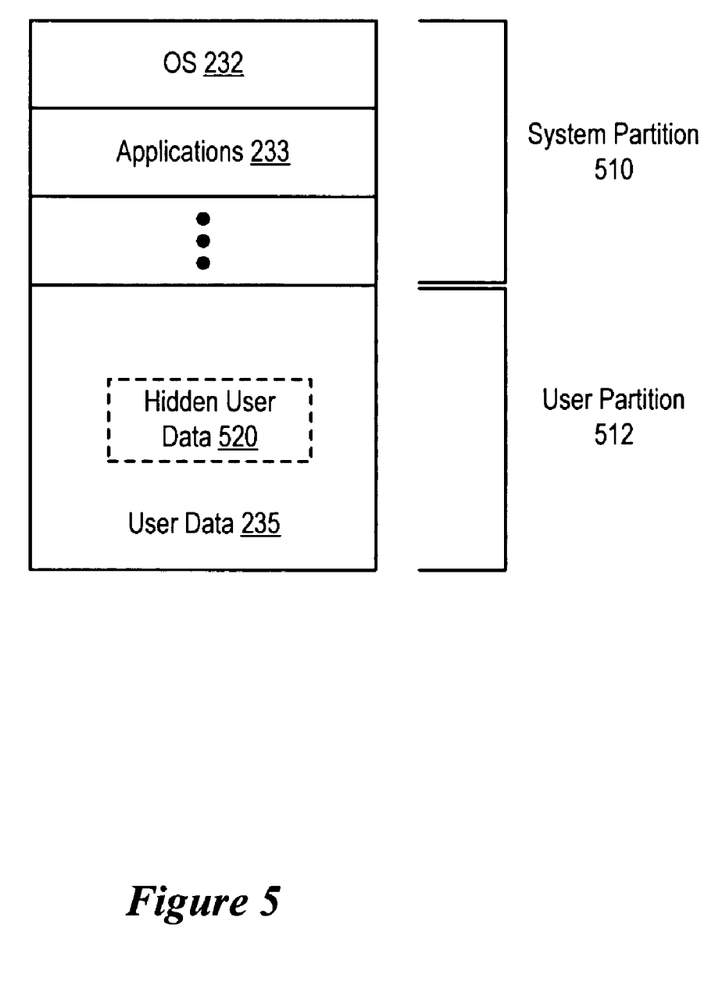
FIG. 5 shows a flow chart of the operation of a system for restricting the ability of a user to transfer content from within a personal internet communicator.

Referring to FIG. 5, a block diagram of the partitions of the HDD is shown. More specifically, the HDD 209 includes a system partition 510 and a user partition 512. All non-user content (e.g., the operating system 232, applications 233, etc.) is stored within the system partition 510. User data 235 is stored within the user partition 512. The user data 235 is the data that is specific to a particular user.

Within the user partition, a directory structure may be stored within a hidden user data portion 520 of the user partition 512. This hidden user data is controlled via the shell filter module 432 or the viewer module 424 so that the hidden user data 520 is not directly accessible by the user. Thus, certain content that is stored within the user partition 512 is not directly accessible by the user. For example, while a user might access mail files via an email application program and the email files are stored in the user partition 512, the user cannot directly access to these email files. Also for example, while the user data might include cookies that are stored when accessing particular web sites, these cookies are stored within the hidden user data portion 520 of the user partition 512 are not directly accessible by the user.

Figure 6:
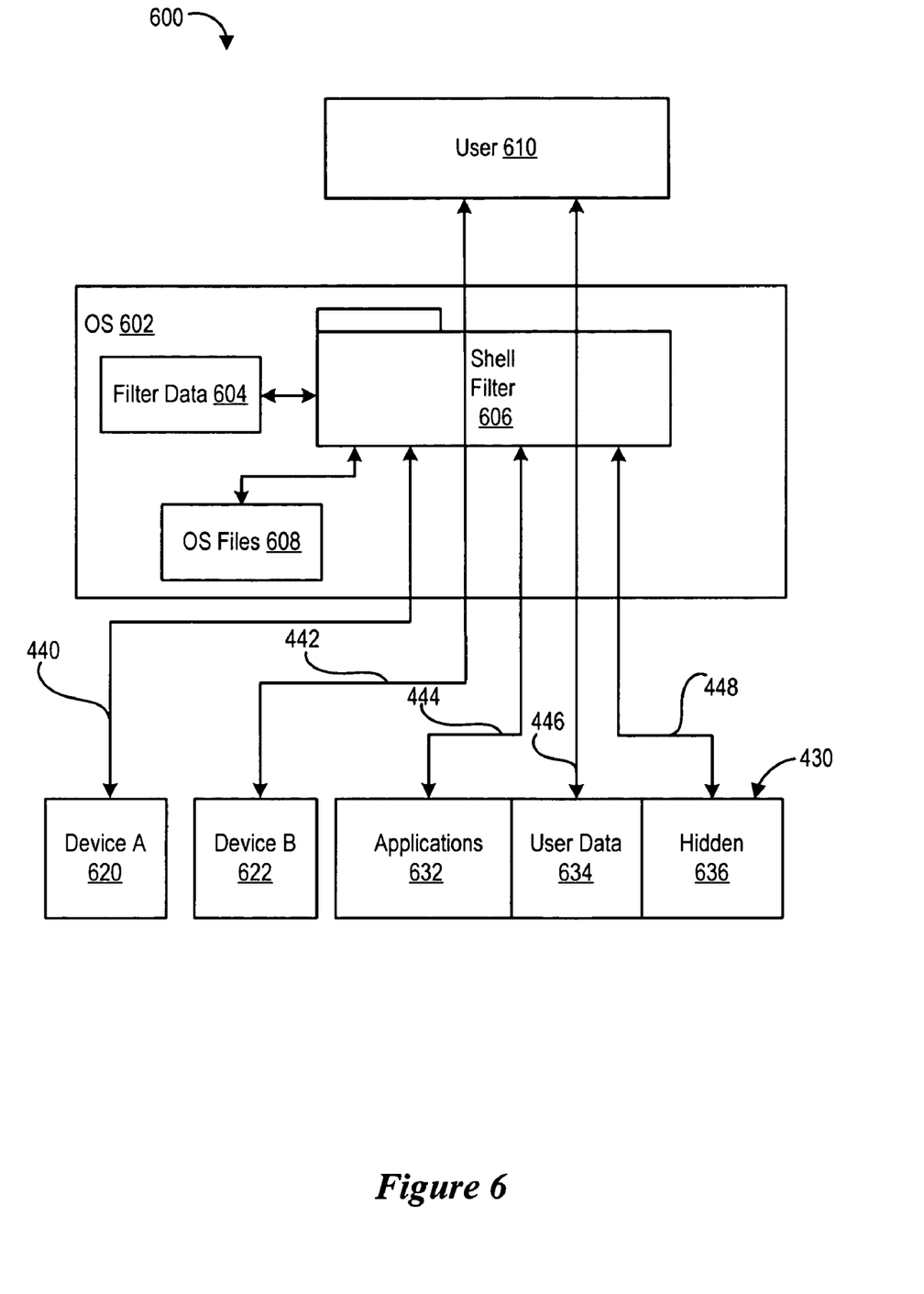
FIG. 6 shows a control flow diagram the operation of a shell filter.

Referring to FIG. 6, shows a control flow diagram 600 representation of a shell filter 606 that is used to prevent transfer of non-user content from devices, directories and files by a user is shown. As shown, the shell filter 606 acts as a monitoring program between user 610 and the operating system files 608, devices 620, 622, applications 632, user data 634 and any hidden directories or files 636. In a selected embodiment, communications between the user 610 and a program or application are passed by the shell filter 606, except that the control functionality for any program or application is limited by the shell filter so that the user 610 is only able to delete or transfer predetermined user data 634, but is otherwise unable to delete or transfer operating system files 608, devices (e.g., Device A 620), applications 632 or hidden data 634. This is illustrated in FIG. 6, where the control signal path 646 between the user data 634 and the user 610 is uninterrupted, while the other control signal paths 640, 642, 644, 648 are blocked by the shell filter 606 to prevent the "delete" functionality from reaching the user 610.

In a selected embodiment of the present invention depicted in FIG. 6, the shell filter 606 is written to generically handle a many different types of applications and programs. Additional configuration property information that is specific to individual applications or programs may also be stored in a filter data table 604 (e.g., a filter string). Thus, if a first application has a first configuration data value indicating that the first application is not protected, then the shell filter 606 permits transfer type commands to act on the first application. However, if a second application or other resource (such as a device, directory, file or program) has a second configuration data value indicating that the second application/resource is protected, then the shell filter 606 disables transfer type commands from acting on the second application/resource.

Figure 7:
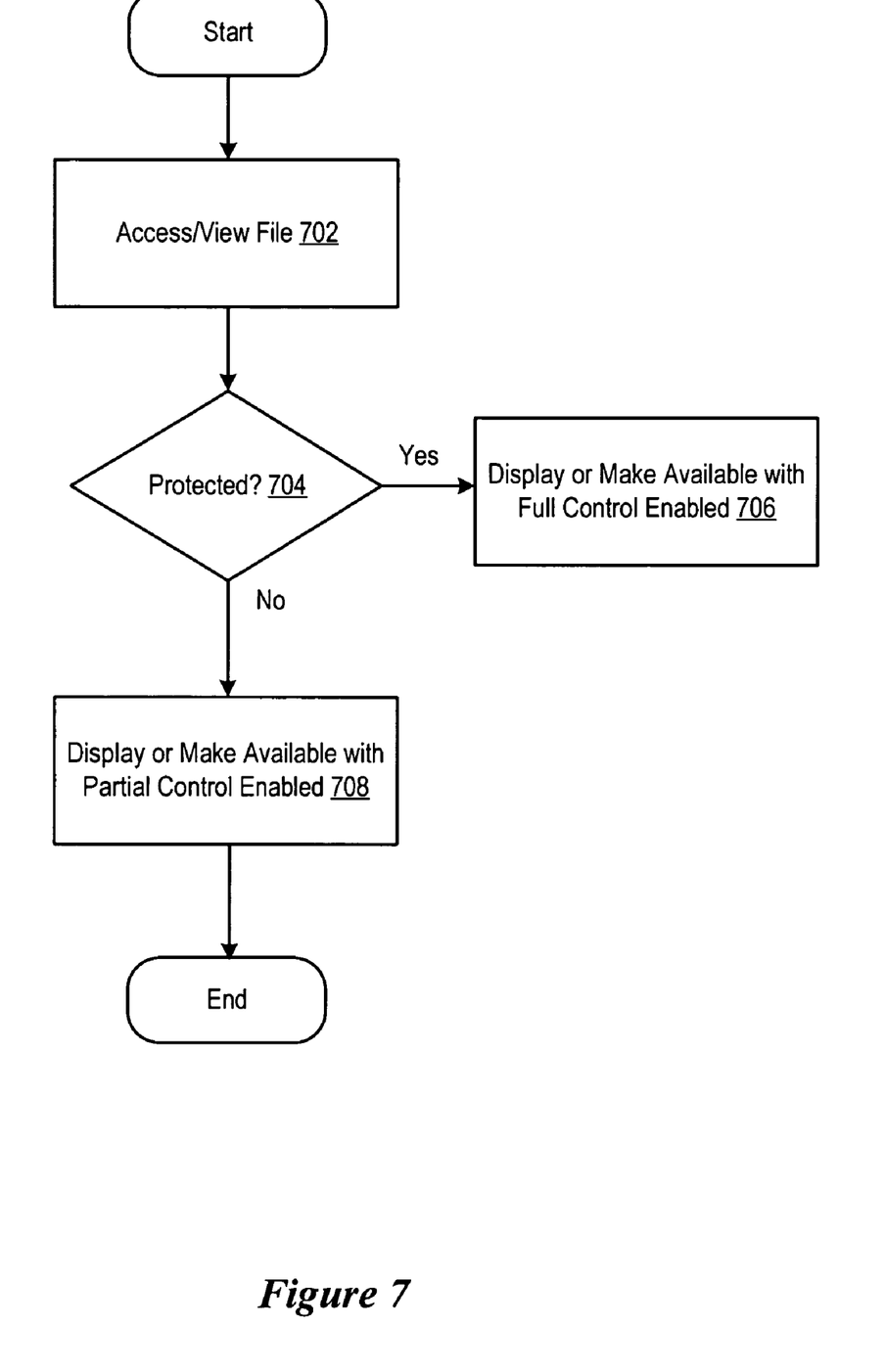
FIG. 7 shows a flow chart of the operation of a system for restricting the ability of a user to transfer content from a computer system.

FIG. 7 shows a flow chart of the operation of a system for restricting the ability of a user to transfer content from a computer system, such as a personal internet communicator. Each time the user wants to access or view an application or file from the hard drive (step 702), the shell filter module in the operating system determines if the application or file is protected (step 704), such as by accessing configuration data associated with each requested application or file or otherwise obtaining object properties for the requested application/file. If the requested application/file is not protected (negative outcome to decision 704), then the requested application/file is displayed or made available to the user with full control functionality enabled (step 706). In this mode, the user is able to delete the requested application/file. Examples of unprotected application/file information include files or documents created by a user in a word processing application.

On the other hand, if the requested application/file is protected (affirmative outcome to decision 704), then the requested application/file is displayed or made available to the user with only limited control functionality enabled (step 708), thereby preventing the requested application/file from being transferred by the user. Examples of protected application/file information include operating system files, application files, master boot record files, and even user data files that have been saved as undeletable files.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for restricting an ability of a user to transfer content from within a personal internet communicator comprising:
    providing the personal internet communicator with non-volatile storage, the non-volatile storage including a system partition and a user partition;
    storing non-user content within the system partition of the non-volatile storage;
    storing user data within the user partition of the non-volatile storage; and,
    configuring an operating system so that a user may not access the non-user content stored within the system partition so as to restrict the ability of the user to transfer content from within the personal internet communicator; and,
    storing user data within a hidden user data portion of the user partition, the user data stored within the hidden user data portion of the user partition being inaccessible by the user; and wherein
    the operating system further comprises a shell filter module, the shell filter module controlling access to the user data and the non-user data, the shell filter module being configured to hide the non-user content such that the non-user content is hidden and inaccessible to the user so that there can be no transfer of the non-user content and no inadvertent deletion of the non-user content, the shell filter module comprising a lockdown filter, the lockdown filter preventing the restricted information from being modified by the user; and,
    when access to the non-user content is desired, the shell filter is capable of being disabled via a utility.

2. The method of claim 1, further comprising
    providing a viewing application, the viewer application being configured so that non-user content may not be accessed by the user.

3. The method of claim 2, wherein
    the viewing application disables certain file functions for non-user content.

4. The method of claim 3, wherein
    the certain file functions include at least one of a save function and a copy function.

5. An apparatus for restricting an ability of a user to transfer content from within a personal internet communicator comprising:
    non-volatile storage, the non-volatile storage including a system partition and a user partition;

means for storing non-user content within the system partition of the non-volatile storage;

means for storing user data within the user partition of the non-volatile storage; and, means for configuring the operating system so that a user may not access the non-user content stored within the system partition so as to restrict the ability of the user to transfer content from within the personal internet communicator; and, means for storing user data within a hidden user data portion of the user partition, the user data stored within the hidden user data portion of the user partition being inaccessible by the user; and wherein the operating system further comprises a shell filter module, the shell filter module controlling access to the user data and the non-user data, the shell filter module being configured to hide the non-user content such that the non-user content is hidden and inaccessible to the user so that there can be no transfer of the non-user content and no inadvertent deletion of the non-user content, the shell filter module comprising a lockdown filter, the lockdown filter preventing the restricted information from being modified by the user; and, when access to the non-user content is desired, the shell filter is capable of being disabled via a utility.

6. The apparatus of claim 5, further comprising means for providing a viewing application, the viewer application being configured so that non-user content may not be accessed by the user.

7. The apparatus of claim 6, wherein the viewing application disables certain file functions for non-user content.

8. The method of claim 7, wherein the certain file functions include at least one of a save function and a copy function.

9. A personal internet communicator comprising:

a processor;

a non-volatile memory coupled to the processor, the non-volatile memory including a system partition and a user partition, non-user content being stored within the system partition of the non-volatile storage, user data being stored within the user partition of the non-volatile storage; and, an operating system stored within the system partition of the non-volatile memory, the operating system controlling user access so that a user may not access the non-user content stored within the system partition to restrict an ability of a user to transfer content from within the personal internet communicator; and, user data is stored within a hidden user data portion of the user partition, the user data stored within the hidden user data portion of the user partition being inaccessible by the user; and wherein the operating system further comprises a shell filter module, the shell filter module controlling access to the user data and the non-user data, the shell filter module being configured to hide the non-user content such that the non-user content is hidden and inaccessible to the user so that there can be no transfer of the non-user content and no inadvertent deletion of the non-user content, the shell filter module comprising a lockdown filter, the lockdown filter preventing the restricted information from being modified by the user; and, when access to the non-user content is desired, the shell filter is capable of being disabled via a utility.

10. The personal internet communicator of claim 9, further comprising an image viewing application, the viewer application being configured so that non-user content may not be accessed by the user.

11. The personal internet communicator of claim 10, wherein the image viewing application disables certain file functions for non-user content.

12. The personal internet communicator of claim 11, wherein the certain file functions include at least one of a save function and a copy function.

* * * * *